United States Patent [19]

Sansone

[11] Patent Number: 5,737,067
[45] Date of Patent: Apr. 7, 1998

[54] LENGTH AND ELONGATION SENSOR

[75] Inventor: Louis E. Sansone, Brooklyn, Conn.

[73] Assignee: The United States of America as represented by the Secretary of the Navy, Washington, D.C.

[21] Appl. No.: 637,000

[22] Filed: Apr. 18, 1996

[51] Int. Cl.$^6$ .................. G01C 3/08; G01B 11/16; G01B 11/02

[52] U.S. Cl. .................. 356/5.01; 356/32; 356/383

[58] Field of Search .................. 356/4.01, 5.01, 356/383, 73.1, 32

[56] References Cited

U.S. PATENT DOCUMENTS

| | | | |
|---|---|---|---|
| 4,928,004 | 5/1990 | Zimmermann et al. | 250/227.14 |
| 4,950,886 | 8/1990 | Claus et al. | 250/227.14 |
| 5,359,405 | 10/1994 | Andrews | 356/35.5 |
| 5,381,005 | 1/1995 | Chazelas et al. | 250/227.19 |
| 5,488,475 | 1/1996 | Friebele et al. | 356/352 |
| 5,499,313 | 3/1996 | Kleinerman | 385/123 |

*Primary Examiner*—Mark Hellner
*Attorney, Agent, or Firm*—Michael J. McGowan; Prithvi C. Lall; Michael F. Oglo

[57] ABSTRACT

A length and elongation sensor includes an elastomeric optical wave guide and a time domain reflectometer. The elastomeric optical wave guide consists of a urethane outer cladding and an optical gel core. A transparent window is hermetically sealed to the first end of the optical wave guide and a reflective mirror is hermetically sealed to the second end of the optical wave guide. Both ends of the wave guide are then fixedly attached to the unit to be measured. The time domain reflectometer is operative for propagating a light pulse through the optical wave guide and for measuring the round-trip propagation time of the light pulse. Since the velocity of the light pulse is known, the length of the wave guide can easily be determined. The wave guide is stretchable up to 25% of its original length thereby allowing both static and dynamic length measurements of the unit to be measured.

6 Claims, 1 Drawing Sheet

LENGTH AND ELONGATION SENSOR

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The instant invention relates to length and elongation sensors and more particularly to a length and elongation sensor which uses an elastomeric optical wave guide to measure length and elongation.

(2) Description of the Prior Art

Length and elongation sensors have heretofore been known in the art. In this connection, a prior art length and elongation sensor comprises a small rigid cable and a recoil mechanism connected to a potentiometer. The opposite end of the cable is fastened to the far end of an object to be measured. Length and elongation measurements are made by monitoring the voltage at the output terminals of the potentiometer, which essentially acts as a voltage divider. While the prior art length and elongation sensors function adequately, they have several disadvantages. It has been found that the mechanical recoil mechanism is subject to jamming and wear, and that the cable itself is subject to wear and abrasion by other components which may be packaged with such a sensor, as in the case of a towed sonar array system. It is also known that the life cycle of a potentiometer is limited and unpredictable. Still further, the electrical circuitry of the sensor is subject to electro-magnetic interference.

SUMMARY OF THE INVENTION

Accordingly, it is an object of the instant invention to provide a length and elongation sensor which does not rely on mechanical parts that are subject to wear and jamming.

It is another object to provide a length and elongation sensor which is not susceptible to electro-magnetic interference or the influence of other external conditions, such as temperature.

It is still another object to provide a length and elongation sensor which uses fiber optic technology to measure length and elongation.

It is yet another object to provide a length and elongation sensor which is stretchable up to twenty-five percent of its original length.

These objects are accomplished in the present invention by providing a length and elongation sensor comprising an elastomeric optical wave guide and a time domain reflectometer. The elastomeric optical wave guide comprises a urethane outer cladding and an optical gel core. A transparent window is hermetically sealed to the first end of the optical wave guide and a reflective mirror is hermetically sealed to the second end of the optical wave guide. Both ends of the wave guide are then fixedly attached to a unit which is to be measured, such as an acoustic module in a towed sonar array system. The time domain reflectometer is connected to the first end of the optical wave guide wherein it is operative for propagating a light pulse through the optical wave guide and for measuring the round-trip propagation time of the light pulse. Since the velocity of the light pulse is known, the length of the optical wave guide can easily be determined, and further, since the wave guide is stretchable up to 25% of its original length, both static and dynamic length measurements of the acoustic module can be measured.

Other objects, features and advantages of the invention shall become apparent as the description thereof proceeds when considered in connection with the accompanying illustrative drawings.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
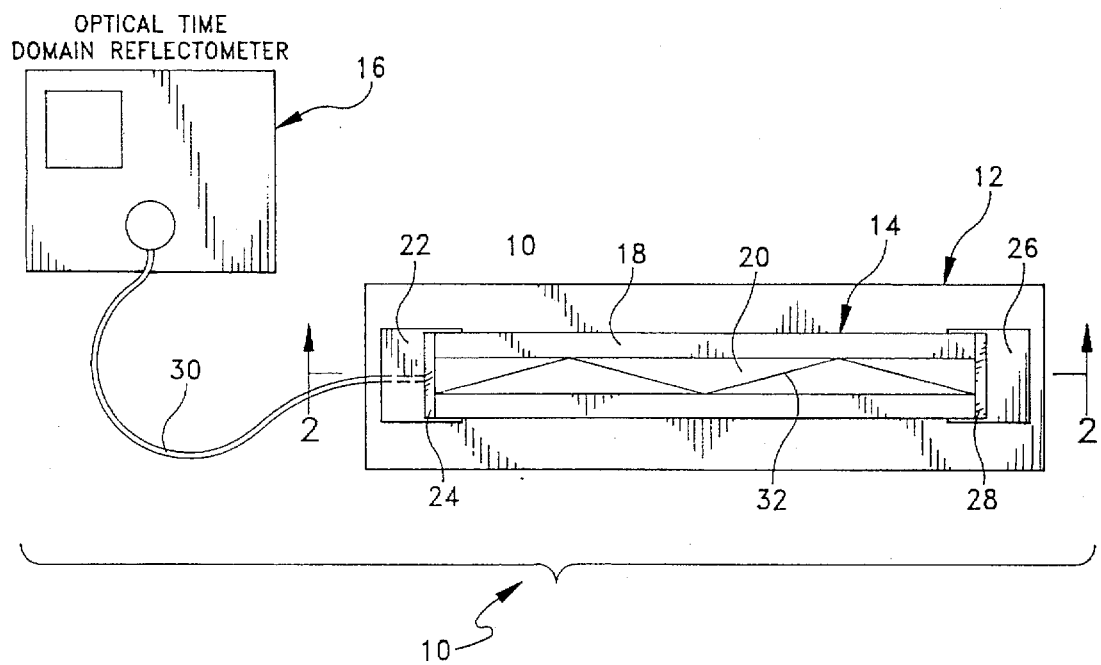
FIG. 1 is a schematic view of the length and elongation sensor of the instant invention with the optical wave guide shown in cross-section.
Figure 2:
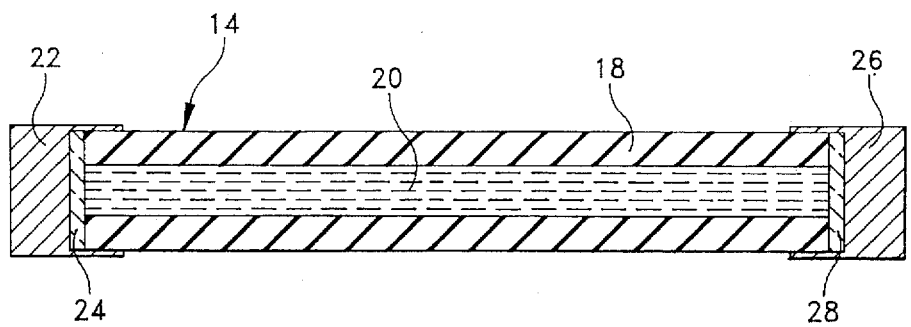
FIG. 2 is an enlarged cross-sectional view of the optical wave guide.

Referring now to the drawings, the length and elongation sensor of the instant invention is illustrated, and generally indicated at 10 in FIG. 1. As will hereinafter be more fully described, length and elongation sensor 10 utilizes fiber optic technology to measure the static length and dynamic elongation of an acoustic module 12 in a towed sonar array system (not shown), wherein the length of acoustic module 12 is known to change from its resting length when it is placed under tow conditions. Length and elongation sensor 10 comprises an optical wave guide generally indicated at 14, and a time domain reflectometer generally indicated at 16. Time domain reflectometer 16 operates on the principles of optical time domain reflectometry (OTDR) to measure the length of the wave guide 14. More specifically, OTDR measures the round trip propagation time of a pulse of light reflected at a reflector in a wave guide. Since the velocity of propagation is known, the length of the sensor is easily determined. Optical wave guide 14 comprises an elastomeric, tubular outer cladding 18, a transparent, semi-liquid core 20, a first end connector 22 including a transparent window 24, and a second end connector 26 including a reflective mirror 28.

Elastomeric outer cladding 18 preferably comprises a stretchable elastomer, such as urethane, silicone, TPR or TEFLON (Registered trademark of Dupont), and it preferably has a lower index of refraction than core 20 so that there is a total internal reflection of light within wave guide 14. Elastomeric outer cladding 18 is preferably has an elasticity which allows it to stretch up to twenty-five percent of its original length.

Core 20 preferably comprises an index-matching, or optical, gel having an index of refraction higher than outer cladding 18. Core 20 is preferably injected, under pressure, inside outer cladding 18 during an extrusion manufacturing process so as to eliminate all voids. In order to further eliminate voids, gel 20 is de-aerated before injection into cladding 18.

Transparent window 24 and reflective mirror 28 are hermetically sealed to outer cladding 18 at their respective ends of optical wave guide 14 so as to prevent core 20 from leaking out of outer cladding 18 during elongation. Transparent window 24 allows light pulses to enter at the first end of wave guide 14. Reflective mirror 28 is operative for reflecting light pulses back through wave guide 14 toward the first end thereof.

As illustrated in FIG. 1, first end connector 22 is fixedly attached to acoustic module 12 and second end connector 26 is also fixedly attached to acoustic module 12. In this manner, when acoustic module 12 elongates under tow conditions, elastomeric optical wave guide 14 also elongates.

Time domain reflectometer 16 includes a fiber optic connector cable 30 which is coupled to first end connector 22. The detailed structure and operation of time domain reflectometer 16 are conventional and well known in the art and therefore no further description will be given.

In use, time domain reflectometer 16 is operative for propagating a light pulse 32 (FIG. 1) which is transmitted through the optical fiber 30 to optical wave guide 14. Light pulse 32 passes through transparent window 24, through core 20 to mirror 28 where it is reflected back through core 20. Time domain reflectometer 16 is further operative for measuring the round trip propagation time of light pulse 32 as it travels from first end connector 22 to second end connector 26 and back to first end connector 22. Since the velocity of light pulse 32 is known, the length of wave guide 14, and acoustic module 12 can easily be determined. Further, since wave guide 14 is stretchable up to 25% of its original length, both static and dynamic length measurements can be obtained. In this regard, when optical wave guide 14 is stretched under tow conditions, the round trip propagation time of light pulse 32 increases thereby indicating a corresponding change in length.

It can therefore be seen that the instant invention provides an effective length and elongation sensor 10 for measuring the static and dynamic length of acoustic module 12 in a towed Sonar array system. Length and elongation sensor 10 utilizes an elastomeric optical wave guide 14 which is operable for stretching up to twenty-five percent of its original length while further being operative for transmitting light pulses 32 along its length. Length and elongation sensor 10 contains no moving parts, it is stretchable so as to reduce abrasion and wear from other cables packaged within the sonar array system, and it is not subject to electromagnetic interference or external conditions, such as temperature. For these reasons, it is believed that length and elongation sensor 10 represents a significant advancement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A length and elongation sensor comprising:

an optical wave guide comprising an elastomeric outer cladding and a transparent semi-liquid core, said optical wave guide having first and second ends;

a transparent window hermetically sealed to said first end of said optical wave guide;

a reflective mirror hermetically sealed to said second end of said optical wave guide;

means for attaching said first end of said optical wave guide to a unit to be measured;

means for attaching said second end of said optical wave guide to said unit to be measured;

means for propagating a light pulse through said core of said optical wave guide so as to reflect off said mirror at said second end; and means for measuring the round trip propagation time of said light pulse through said optical wave guide.

2. In the length and elongation sensor of claim 1, said means for propagating said light pulse and said means for measuring the round trip propagation time of said light pulse comprising a time domain reflectometer.

3. In the length and elongation sensor of claim 1, said elastomeric outer cladding comprising urethane.

4. In the length and elongation sensor of claim 1, said semi-liquid core comprising optical gel.

5. In the length and elongation sensor of claim 1, said elastomeric outer cladding having a predetermined index of refraction, said semi-liquid core having a higher index of refraction than said elastomeric cladding.

6. In the length and elongation sensor of claim 1, said elastomeric outer cladding being stretchable up to 25% of its original length.

\* \* \* \* \*